Feb. 7, 1956     G. D. ZIMMERMAN     2,733,616
GEARING
Filed May 24, 1954                             3 Sheets-Sheet 1
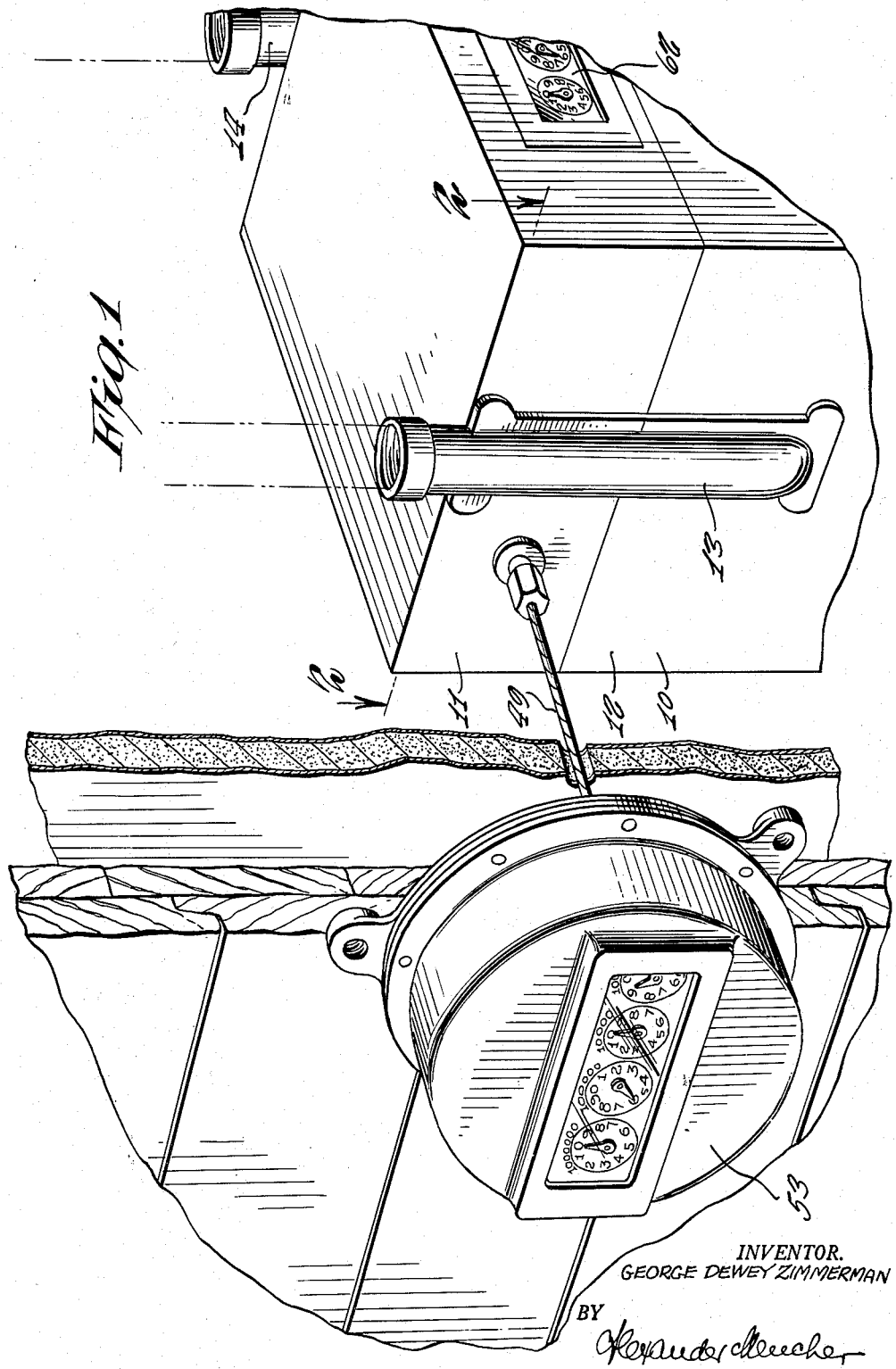
INVENTOR.
GEORGE DEWEY ZIMMERMAN
BY
*Alexander Meecher*
ATTORNEY

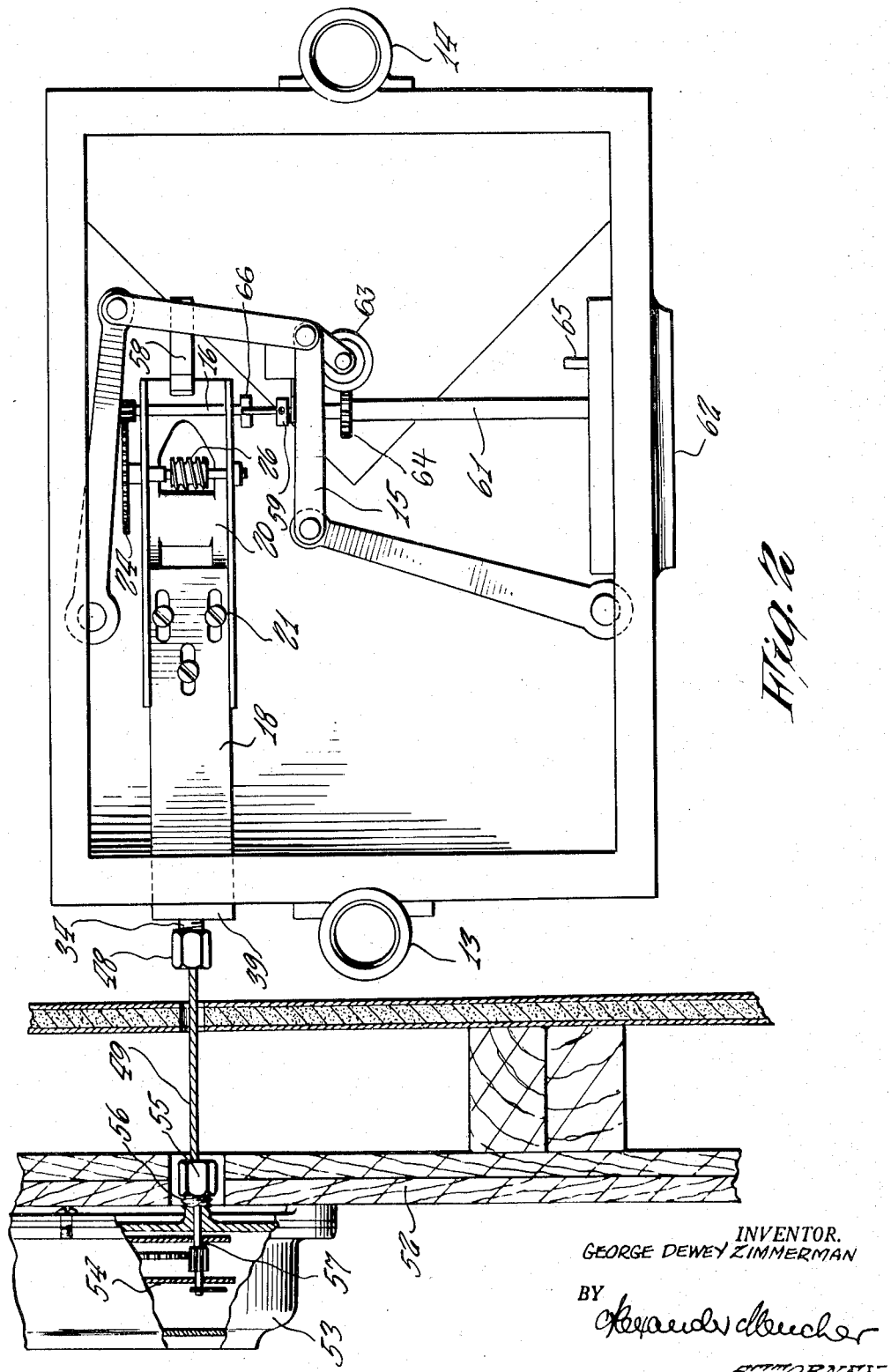

Feb. 7, 1956    G. D. ZIMMERMAN    2,733,616
GEARING
Filed May 24, 1954    3 Sheets-Sheet 3
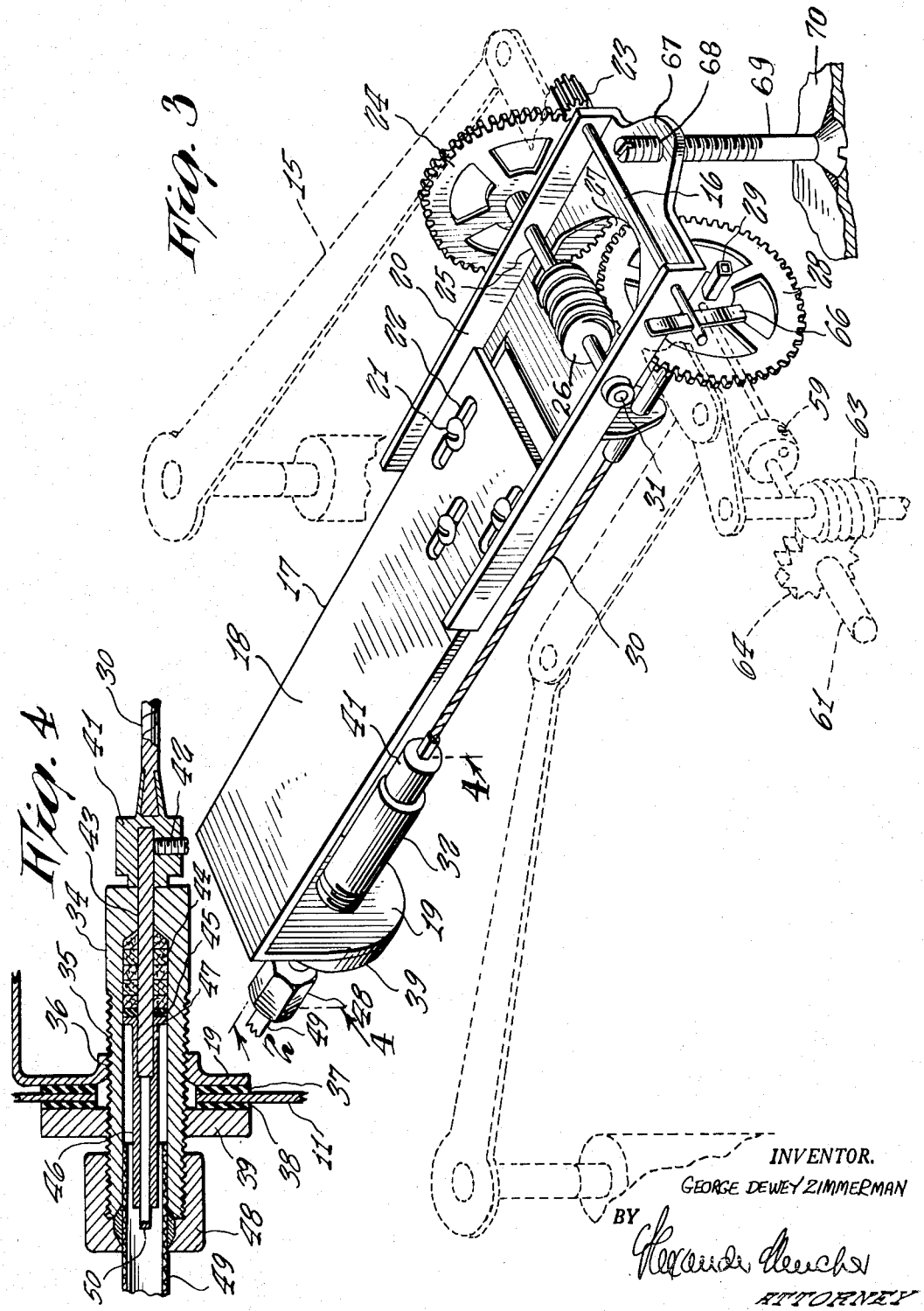
INVENTOR.
GEORGE DEWEY ZIMMERMAN
BY
ATTORNEY

United States Patent Office 2,733,616
Patented Feb. 7, 1956

2,733,616

GEARING

George Dewey Zimmerman, Pelham Manor, N. Y.

Application May 24, 1954, Serial No. 431,875

4 Claims. (Cl. 74—412)

This invention relates to gas metering devices.

It is an object of the present invention to provide a gas metering device with a take-off arrangement to drive a remote gear train unit, that is adjustable within the main meter and attachable therewithin for proper alignment with the indicating mechanism of the main meter so that both mechanisms, the one in the remote location as on the outer side of the house, and the one on the main meter, shall be driven in unison and with a differential depending upon the gearing provided on the attachment, the adjustment of the attachment being such as to properly locate the connection with the indicating mechanism of the main meter.

It is another object of the invention to provide a self-contained stuffing box on an attachment or adapter to render the standard gas meter adapted to power a remote indicating mechanism by a simple attachment to the adapter of a flexible drive shaft, leading from the main meter to the remote measuring mechanism.

Other objects of the present invention are to provide an attachment for a gas meter device having the above objects in mind, which is of simple construction, inexpensive to manufacture, easy to install, compact, has a minimum number of parts, easily adjusted to a different length, serves for the connection thereto of a flexible cable with the indicating mechanism of the main meter, whereby both mechanisms, the one on the meter and the one in the remote location will be driven in unison, compact and efficient in operation.

For other objects and for a better understanding of the invention, reference may be had to the following description taken in connection with the accompanying drawing in which:

Figure 1 is a perspective view of a gas meter and of a measuring device remotely located on the outer side of a building and connected with the gas meter within the building to be driven by the same.

Figure 2 is a transverse sectional view of the main meter and looking in plan upon the attachment and as viewed on line 2—2 of Figure 1.

Figure 3 is an enlarged perspective view of the adjustable drive attachment.

Figure 4 is an enlarged sectional view of the bushing forming a part of the attachment and as viewed on line 4—4 of Figure 3.

Referring now to the figures, 10 represents a standard gas meter having a top part 11 and a bottom part 12. The bottom part of the gas meter contains the usual volumetric bellows arrangement for receiving the gas from an inlet pipe 13 and delivering the same through an outlet pipe 14. These pipes extend upwardly along the sides of the meter and may serve as hanger elements for the meter.

The arrangement in the meter includes a linkage 15 which is worked so as to drive a pinion shaft 16 of the attachment embodying the features of the present invention. This attachment is indicated generally at 17 and comprises a bracket member 18 that has a depending projection 19 engageable with the wall of a top casing part 11. A channel member 20 is adjustably connected to the bracket member 18 by means of screws 21. The member 18 has elongated slots 22 for receiving the screws 21 and the screws are fixed in the channel member 20. The upstanding sides of the channel member 20 carry the shaft 16. On one end of the shaft 16 is a pinion 23 that meshes with a large gear 24 on a shaft 25 that is also journalled between the sides of the channel member 20. The shaft 25 has a worm gear 26 that projects through an opening 27 in the bottom of the member 20 to engage with a large gear 28.

The gear 28 is fixed to a hollow square shaft connection 29 on the end of a flexible cable 30 that extends longitudinally of the attachment. Flexible cable 30 is journalled in a depending bracket 31 off the member 20 and is axially aligned with the bracket portion 19 of the bracket member 18. The cable 30 is attached to a bushing device 32 which is secured to the side of the top part 11 of the meter.

The bushing device includes a main hollow body member 34 threaded at 35 to fit an internally threaded boss 36 of the bracket portion 19. A washer 37 is disposed on the member 34 between the wall of the part 11 and the engaging face of the depending portion 19 of the bracket 18. Another washer 38 is disposed on the exterior of the casing and by a threaded ring 39 the bushing 34 is locked in place. The sealing washers 37 and 38 are brought tightly against the walls of the top part to prevent any gas leakage through the hole in the wall of the top part.

The flexible cable 30 has an attaching head 41 with a set screw 42. This head can be attached to a drive member 43 within the bushing body 34. This drive member is surrounded with a packing 44 formed of rings and disposed within the hollow bushing body 34. A washer 45 engages the end of the sealing rings 44 which latter are sufficiently porous to permit escape of gas through the vent of tubing 49 but serves as a dust trap to prevent dirt from entering. The short shaft 43 has a splined coupling sleeve 46 rigidly fixed thereto and this sleeve has a flange 47 that abuts the washer 45 so that upon engagement of the head 41 with the shaft 43 the packing is held against axial displacement.

A cap 48 carries a flexible sleeve or tubing 49 which is vented (not shown) to the atmosphere for escape of gases in the meter gallery and which houses a shaft 50 which couples with the sleeve connection 46. This cap 48 can be threaded on the outer end of the sleeve body 34 and then a portion of the sleeve 49 extends inwardly of the body and overlaps the sleeve connection 46. This sleeve connection preferably has a square opening to have driving connection with a square end of the shaft 50.

On the exterior of a building structure 52 there can be located an outside meter indicating mechanism 53 having the usual gear train 54. Tube 49 connects with a cap 55 that can be secured to a threaded projection 56 of the meter 53. The drive shaft 50 within the tube 49 connects with a shaft 57 of the meter indicating mechanism 53 through a sleeve connection, not shown but similar to the sleeve 46.

On the end of the channel member 20 (Figure 2) is provided an extension 58 which may serve to support the linkage 15. The shaft 16 at one end has a slip clutch such as a flexible blade 66 engageable by a coupling member 59 attached to a shaft 61. The latter extends to measuring device 62 mounted in the front of the top part 11. If the attachment mechanism fails for any reason, the outer shaft portion of member 59 will slip over blade 66.

Bottom wall of channel 20 may have an extension 67 (Figure 3), with one or more threaded openings 68 and through which one or more adjusting screws 69 passes, the base or bases of said screw or screws being secured or soldered to the floor 70 of the meter gallery after adjustment. In Figure 3, extension 58 is omitted.

By having the attachment parts 18 and 20 adjustable relative to each other the shaft 16 can be properly aligned for connection through a shaft 61 with the measuring device 62. The shaft 61 is driven by a worm gear 63, Figure 3, engaging with a gear 64 on the shaft 61. For different meters of different dimensions and for any difference in the position of the measuring device 62, the screws 21 can be loosened and the adjustment of the channel member 20 may be made relative to the bracket member 18.

It will be seen that both measuring devices, the one on the meter and the remote one, will be driven in unison and in synchronism with each other. The squared end connection 29 of the flexible shaft 30 can receive another flexible cable for effecting the drive of another indicating mechanism that may be located elsewhere within the meter casing or for effecting connection with another type of connection 65 on the metering device 62.

It should now be apparent that there has been provided an attachment which can be easily installed on the inside of a gas meter casing and which carries a bushing that is extendable through the casing for securement of the attachment to the casing and wherein the attachment has two parts that can be adjusted longitudinally so that the attachment can be adapted for any slight variations in a gas meter and for different types of meters and further the attachment can be hooked up in synchronism with the indicating mechanism of the meter so that the remote indicating mechanism is driven simultaneously with the meter mechanism.

While various changes may be made in the detail construction, it shall be understood that such changes shall be within the spirit and scope of the appended claims.

I claim:

1. A mechanism for driving a remote register comprising a bracket support fitted to the inside of a meter casing, said bracket support having a depending end projection, a bushing carried by the said projection and extending through the meter casing, a first shaft connection within said bushing for connection with a remote mechanism shaft, said bracket support having a second depending projection spaced from the first mentioned projection, a drive shaft inside of the meter casing, a driving mechanism for said first shaft connection in the bracket support and adjacent said second projection, transverse shafts connected to the bracket support for rotation therein, a pair of gears on and interconnecting said transverse shafts, a driven shaft journalled in the second mentioned projection and connected at one end with said bushing first shaft connection, a gear on said driven shaft, a worm on one of said transverse shafts meshing with last mentioned gear for driving the driven shaft and the bushing first shaft connection, and a flexible shaft connected to the other end of the bushing first shaft connection to drive the remote register.

2. A mechanism for driving a remote register comprising a bracket support fitted to the inside of a meter casing, a pair of spaced end projections depending therefrom, a bushing carried by and extending through one end projection, a shaft connection within and at both ends of said bushing, a driven shaft mounted on the other end projection and connected at one end to one of ends of the said bushing shaft connection, a drive shaft inside of the meter closing, driven mechanism mounted on said bracket support for the said driven shaft, and a flexible and rotatable shaft connected to the other end of the bushing shaft connection to drive said register.

3. A mechanism for driving a remote register as set forth in claim 1 wherein the bracket support comprises two members adjustably secured together for longitudinal adjustment.

4. A mechanism for driving a remote register as set forth in claim 1 wherein the bracket support at one end is provided with a securing lug for affixation to a support.

No references cited.